United States Patent
Kataoka et al.

(10) Patent No.: US 10,896,296 B2
(45) Date of Patent: Jan. 19, 2021

(54) NON-TRANSITORY COMPUTER READABLE RECORDING MEDIUM, SPECIFYING METHOD, AND INFORMATION PROCESSING APPARATUS

(71) Applicant: FUJITSU LIMITED, Kawasaki (JP)

(72) Inventors: Masahiro Kataoka, Kamakura (JP); Tomonori Ota, Kawasaki (JP); Junya Hiramatsu, Yokohama (JP); Toshiyuki Fujishima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 216 days.

(21) Appl. No.: 16/104,189

(22) Filed: Aug. 17, 2018

(65) Prior Publication Data

US 2019/0065466 A1 Feb. 28, 2019

(30) Foreign Application Priority Data

Aug. 31, 2017 (JP) .................. 2017-167180

(51) Int. Cl.
*G06F 17/27* (2006.01)
*G06F 40/30* (2020.01)
*G06F 16/31* (2019.01)
*G06F 16/33* (2019.01)
*G06F 16/332* (2019.01)
(Continued)

(52) U.S. Cl.
CPC .............. *G06F 40/30* (2020.01); *G06F 16/31* (2019.01); *G06F 16/3329* (2019.01); *G06F 16/3347* (2019.01); *G06F 40/216* (2020.01); *G06F 40/284* (2020.01)

(58) Field of Classification Search
CPC ...... G06F 17/27; G06F 40/30; G06F 16/3329; G06F 16/3347; G06F 40/284; G06F 40/216; G06F 16/31; G10L 15/00

USPC .............................................. 704/9
See application file for complete search history.

(56) References Cited

U.S. PATENT DOCUMENTS

| | | | | |
|---|---|---|---|---|
| 7,653,605 B1 * | 1/2010 | Jackson | ................. | G06Q 30/02 706/20 |
| 9,070,087 B2 * | 6/2015 | Hatami-Hanza | ......... | G06N 5/02 |
| 9,697,477 B2 * | 7/2017 | Oh | ..................... | G06F 16/3329 |

(Continued)

FOREIGN PATENT DOCUMENTS

| | | |
|---|---|---|
| JP | 2013-171550 | 9/2013 |
| JP | 2013-254420 | 12/2013 |

OTHER PUBLICATIONS

Extended European Search Report (EESR) dated Jan. 22, 2019 for the corresponding European patent application No. 18189703.4, 7 pages.

(Continued)

*Primary Examiner* — Michael Colucci
(74) *Attorney, Agent, or Firm* — Xsensus LLP

(57) ABSTRACT

An information processing apparatus accepts information corresponding to a text. The information processing apparatus refers to a storage unit that stores therein co-occurrence information on other texts with respect to the text and information corresponding to the other texts by associating both the information with the text. The information processing apparatus specifies, from among the pieces of information corresponding to the other texts, the text associated with the information corresponding to the other texts that is associated with the co-occurrence information that meets the standard.

9 Claims, 14 Drawing Sheets

| TEXT VECTOR | CO-OCCURRENCE TEXT VECTOR (CO-OCCURRENCE RATE) | ... | CO-OCCURRENCE TEXT VECTOR (CO-OCCURRENCE RATE) |
|---|---|---|---|
| TEXT VECTOR OF ANSWER SENTENCE A1 | ... | ... | ... |
| TEXT VECTOR OF ANSWER SENTENCE A2 | D α 108F97 (37%) | ... | D α 108F19 (24%) |
| TEXT VECTOR OF ANSWER SENTENCE A3 | ... | ... | ... |
| TEXT VECTOR OF ANSWER SENTENCE A4 | ... | ... | ... |

140c

(51) Int. Cl.
*G06F 40/216* (2020.01)
*G06F 40/284* (2020.01)

(56) References Cited

U.S. PATENT DOCUMENTS

| | | | | |
|---|---|---|---|---|
| 2002/0046035 | A1* | 4/2002 | Kitahara | G10L 15/1822 704/277 |
| 2006/0020473 | A1* | 1/2006 | Hiroe | G10L 13/027 704/275 |
| 2011/0066634 | A1* | 3/2011 | Phillips | G10L 15/22 707/769 |
| 2011/0224982 | A1* | 9/2011 | Acero | G10L 15/08 704/236 |
| 2014/0258211 | A1* | 9/2014 | Hatami-Hanza | G06F 16/951 707/603 |
| 2014/0278341 | A1* | 9/2014 | Ranjan | G06F 40/51 704/2 |
| 2015/0095770 | A1* | 4/2015 | Mani | G06F 16/93 715/254 |
| 2016/0027437 | A1* | 1/2016 | Hong | G10L 15/187 704/254 |
| 2017/0235721 | A1* | 8/2017 | Almosallam | G06F 40/232 704/9 |
| 2018/0357531 | A1* | 12/2018 | Giridhari | G06K 9/6267 |
| 2019/0057143 | A1* | 2/2019 | Porter | G06Q 10/10 |

OTHER PUBLICATIONS

Yikang Shen, et al., "Word Embedding Based Correlation Model for Question/Answer Matching", Proceedings of the Thirty-First AAAI Conference on Artificial Intelligence (AAAI-17), pp. 3511-3517, XP055541412, San Francisco, CA, USA, Retrieved from the Internet: URL: https://aaai.org/ocs/index.php/AAAI/AAAI17/paper/download/14384/14142 [Retrieved on Jan. 14, 2019].

Majid Razmara et al., "Answering List Questions Using Co-occurrence and Clustering", Language Resources and Evaluation Conference LREC 2008, pp. 3218-3222, XP055541921.

Yikang Shen, et al., "Question/Answer Matching for CQA System via Combining Lexical and Sequential Information", Proceedings of the Twenty-Ninth AAAI Conference on Artificial Intelligence, pp. 275-281, XP055541978.

EP-OA dated Nov. 30, 2020 for the corresponding European patent application No. 18189703.4.

* cited by examiner

FIG.1

F1
TEXT x[SENTENCE x1, SENTENCE x2, SENTENCE x3, ···, AND SENTENCE xn],
TEXT y[SENTENCE y1, SENTENCE y2, SENTENCE y3, ···, AND SENTENCE yn], ···

⇩ VECTOR OPERATION

F2
TEXT xVec[SENTENCE xVec1, SENTENCE xVec2, SENTENCE xVec3, ···, AND SENTENCE xVecn],
TEXT yVec[SENTENCE yVec1, SENTENCE yVec2, SENTENCE yVec3, ···, AND SENTENCE yVecn], ···

⇕ COMPARE

140c

| TEXT VECTOR | CO-OCCURRENCE TEXT VECTOR (CO-OCCURRENCE RATE) | ... | CO-OCCURRENCE TEXT VECTOR (CO-OCCURRENCE RATE) |
|---|---|---|---|
| TEXT VECTOR OF ANSWER SENTENCE A1 | ... | ... | ... |
| TEXT VECTOR OF ANSWER SENTENCE A2 | D α 108F97 (37%) | ... | D α 108F19 (29%) |
| TEXT VECTOR OF ANSWER SENTENCE A3 | ... | ... | ... |
| TEXT VECTOR OF ANSWER SENTENCE A4 | ... | ... | ... |

⇩

F3
ANSWER SENTENCE A2

| QUESTION TEXT NUMBER | TEXT CONTENT (QUESTION SENTENCE DATA) |
|---|---|
| QUESTION TEXT (1) | WHEN DISPLAYING MIB ON MONITORING TARGET DEVICE, MESSAGE OF "TIMEOUT OCCURS. DETAIL CODE=0, CAUSE CODE=734" IS DISPLAYED. PLEASE LET ME KNOW CAUSE AND COPING METHOD. ··· |
| QUESTION TEXT (2) | "TIMEOUT OCCURS. DETAIL CODE=0, CAUSE CODE=734" APPEARS. PLEASE LET ME KNOW CAUSE AND COPING METHOD. ··· |
| QUESTION TEXT (3) | WHEN ATTEMPTING TO REFER TO INTERFACE INFORMATION ON NETWORK DEVICE, "TIMEOUT OCCURS. DETAIL CODE=0, CAUSE CODE=734" APPEARS. PLEASE LET ME KNOW CAUSE AND COPING METHOD. ··· |

| TEXT VECTOR | CO-OCCURRENCE TEXT VECTOR (CO-OCCURRENCE RATE) | ··· | CO-OCCURRENCE TEXT VECTOR (CO-OCCURRENCE RATE) |
|---|---|---|---|
| TEXT VECTOR OF ANSWER SENTENCE A1 | ··· | ··· | ··· |
| TEXT VECTOR OF ANSWER SENTENCE A2 | $D\alpha$ 108F97 (37%) | ··· | $D\alpha$ 108F19 (24%) |
| TEXT VECTOR OF ANSWER SENTENCE A3 | ··· | ··· | ··· |
| TEXT VECTOR OF ANSWER SENTENCE A4 | ··· | ··· | ··· |

| TEXT VECTOR | ANSWER SENTENCE |
|---|---|
| TEXT VECTOR OF ANSWER SENTENCE A1 | ANSWER SENTENCE A1 |
| TEXT VECTOR OF ANSWER SENTENCE A2 | ANSWER SENTENCE A2 |
| TEXT VECTOR OF ANSWER SENTENCE A3 | ANSWER SENTENCE A3 |
| TEXT VECTOR OF ANSWER SENTENCE A4 | ANSWER SENTENCE A4 |

| VECTOR | CO-OCCURRENCE VECTOR (CO-OCCURRENCE RATE) | ... | CO-OCCURRENCE VECTOR (CO-OCCURRENCE RATE) |
|---|---|---|---|
| VECTOR OF ANSWER SENTENCE A1 | ... | ... | ... |
| VECTOR OF ANSWER SENTENCE A2 | Q$\beta$ 108F97 (37%) | ... | Q$\beta$ 108F19 (29%) |
| VECTOR OF ANSWER SENTENCE A3 | ... | ... | ... |
| VECTOR OF ANSWER SENTENCE A4 | ... | ... | ... |

240c

| VECTOR (EXTREME VALUE) | CO-OCCURRENCE TEXT VECTOR (EXTREME VALUE) (CO-OCCURRENCE RATE) | ... | CO-OCCURRENCE TEXT VECTOR (EXTREME VALUE) (CO-OCCURRENCE RATE) |
|---|---|---|---|
| VECTOR OF ANSWER SENTENCE A1 | ... | ... | ... |
| VECTOR OF ANSWER SENTENCE A2 | Qγ108F97 (37%) | ... | Qγ108F19 (29%) |
| VECTOR OF ANSWER SENTENCE A3 | ... | ... | ... |
| VECTOR OF ANSWER SENTENCE A4 | ... | ... | ... |

340c ns
NON-TRANSITORY COMPUTER READABLE RECORDING MEDIUM, SPECIFYING METHOD, AND INFORMATION PROCESSING APPARATUS

CROSS-REFERENCE TO RELATED APPLICATION

This application is based upon and claims the benefit of priority of the prior Japanese Patent Application No. 2017-167180, filed on Aug. 31, 2017, the entire contents of which are incorporated herein by reference.

FIELD

The embodiments discussed herein are related to a computer-readable recording medium.

BACKGROUND

There is a conventional technology 1 and a conventional technology 2 as examples of conventional technologies of specifying, when a question sentence is received from a user, an answer sentence associated with the received question sentence. For example, the conventional technology 1 is used to perform a morphological analysis on the received question sentence, extract candidates for an answer sentence that includes a lot of feature keywords, calculate feature vectors of the question sentence and a plurality of answer sentences, and display the rank of the maximum likelihood answer sentences.

In the conventional technology 2, by using Solr distributed by Apache or the like, evaluation value is calculated for each feature word that is included in each answer sentence stored in a storage unit and an answer sentence that is highly likely to include an answer associated with the question sentence is specified from a plurality of answer sentences based on the evaluation values.

Patent Document 1: Japanese Laid-open Patent Publication No. 2013-171550

SUMMARY

According to an aspect of an embodiment, a non-transitory computer readable recording medium has stored therein a specifying program that causes a computer to execute a process including: accepting information corresponding to a text having a first type; referring to a storage unit that stores therein co-occurrence information, information corresponding to other texts having the first type and texts having a second type, wherein the co-occurrence information is information on other texts having the first type with respect to a text having the second type; and specifying the text having the second type associated with the information that is associated with the co-occurrence information that meets a standard.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating a process performed by an information processing apparatus according to a first embodiment;

FIG. 3 is a diagram illustrating an example of the data structure of a question sentence DB according to the first embodiment;

FIG. 4 is a diagram illustrating an example of the data structure of a text HMM according to the first embodiment;

FIG. 10 is a diagram illustrating an example of the data structure of a sentence HMM according to the second embodiment;

DESCRIPTION OF EMBODIMENTS

Figure 2:
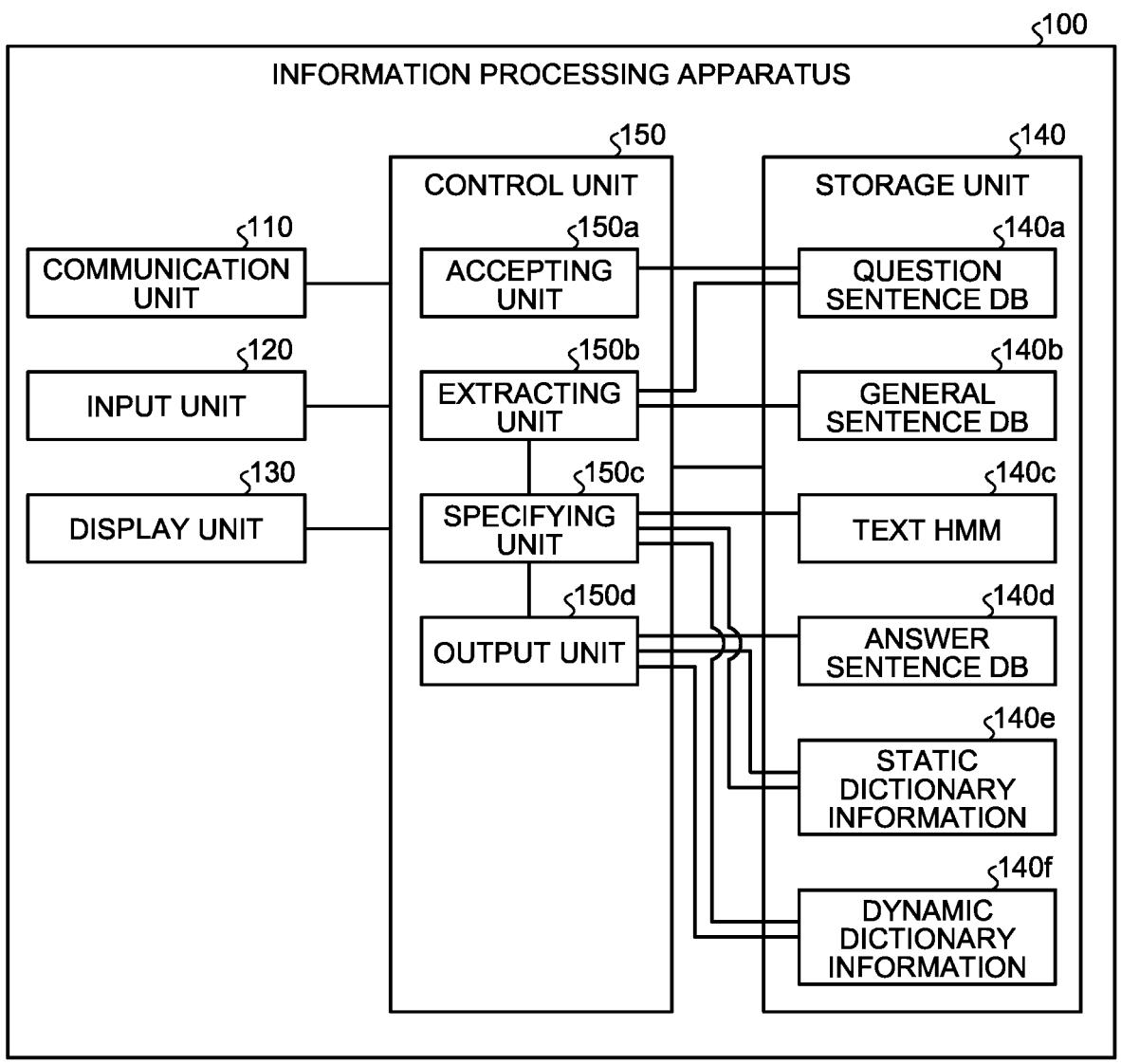
FIG. 2 is a functional block diagram illustrating the configuration of the information processing apparatus according to the first embodiment.

However, with the conventional technologies described above, there is a problem in that it is not possible to reduce the load applied to specify a text.

For example, in the conventional technology 1, the morphological analysis is performed on a question sentence and keyword groups are created; however, due to fluctuation of expressions of synonyms or the like, candidates for the answer sentence are increased. Furthermore, for an arithmetic operation of each of the feature vectors of a question sentence and a lot of answer sentences, a large amount of load of resources and time occurs.

Preferred embodiments of the present invention will be explained with reference to accompanying drawings. Furthermore, the present invention is not limited to the embodiments.

[a] First Embodiment

FIG. 1 is a diagram illustrating a process performed by the information processing apparatus according to a first embodiment. When the information processing apparatus according to the first embodiment acquires question sentence data F1, the information processing apparatus specifies answer sentence data F3 associated with the question sentence data F1 based on the question sentence data F1 and a text hidden Markov model (HMM) 140c.

In the question sentence data F1 according to the first embodiment, a plurality of "texts" is included. A text is formed of a plurality of "sentences". Furthermore, a sentence is a character string that is separated by a period. For example, in the text expressed by "A cluster environment is formed. All of shared resources have been vanished due to an operation error.", the sentences expressed by "A cluster environment is formed." and "All of shared resources have been vanished due to an operation error." are included.

In an explanation of FIG. 1, for convenience of description, it is assumed that a text x and a text y are included in the question sentence data F1. Although not illustrated in FIG. 1, the texts other than the text x and the text y may also be included in the question sentence data F1. Furthermore, it is assumed that the text x is the text associated with a question sentence and it is assumed that the text y and the other texts included in the question sentence data F1 are the texts other than the question sentence.

It is assumed that, in the text x, a sentence x1, a sentence x2, a sentence x3, . . . , and a sentence xn are included. It is assumed that, in the text y, a sentence y1, a sentence y2, a sentence y3, . . . , and a sentence yn are included.

The information processing apparatus calculates text vectors of the text x, the text y, and the other texts. For example, the text vector of the text x is referred to as xVec. The text vector of the text y is referred to as yVec. The vector data created based on the question sentence data F1 is referred to as vector data F2.

An example of a process in which the information processing apparatus calculates the text vector xVec of the text x will be described. The information processing apparatus calculates the sentence vectors xVec1 to xVecn of the sentences x1 to xn, respectively, included in the text x and accumulates each of the sentence vectors xVec1 to xVecn, thereby calculating the text vector xVec of the text x.

Furthermore, if the information processing apparatus calculates a sentence vector, the information processing apparatus calculates a word vector of each of the words included in a sentence based on the Word2Vec technology and accumulates the word vectors of the individual words, thereby calculating the sentence vector. The Word2Vec technology is used to perform a process of calculating a vector of each of the words based on the relationship between a certain word and the other words adjacent to the certain word.

Furthermore, because the process of calculating the text vector yVec of the text y performed by the information processing apparatus is the same as the process of calculating the text vector xVec of the text x, the description thereof will be omitted. The information processing apparatus creates the vector data F2 by performing the process described above.

The information processing apparatus specifies the text vector of an answer sentence that is associated with the text x by comparing the text HMM 140c with the text vectors of the text y and the other texts both of which co-occur with the text x included in the vector data F2.

The text HMM 140c associates text vectors with a plurality of co-occurrence text vectors. Each of the text vectors in the text HMM 140c is the text vector calculated from an answer sentence (a text of an answer sentence) and the answer sentence is determined from the text vectors. Each of the co-occurrence text vectors is the text vector obtained from the text that co-occurs with the text of the question sentence included in the question sentence data.

Each of the co-occurrence text vectors is associated with a co-occurrence rate. For example, if the answer sentence of the text x in the question sentence data F1 is an answer sentence A2, possibility that the text vector of the text that co-occurs with the text x becomes "D$\alpha$108F97" is "37%" and the possibility that the text vector becomes "D$\alpha$108F19" is "29%".

The information processing apparatus compares the text vector (the text vector yVec or the other text vectors) appearing before or after the text vector xVec that is included in the vector data F2 with each of the co-occurrence text vectors in the text HMM 140c and determines a hit record. For example, if the text vector yVec is matched with (or similar to) the co-occurrence text vector "D$\alpha$108F97", the information processing apparatus specifies the answer sentence A2 as the answer sentence of the text x.

As described above, the information processing apparatus calculates a text vector of each of the texts included in the question sentence data F1, compares the text vectors of the texts that co-occur with the text associated with the question sentence with the co-occurrence text vectors in the text HMM 140c, and specifies an answer sentence. Because the information processing apparatus specifies the answer sentence based on the co-occurrence relation with the text of the question sentence in the question sentence data F1, it is possible to reduce the load applied to specify a text.

In the following, an example of the configuration of the information processing apparatus according to the first embodiment will be described. FIG. 2 is a functional block diagram illustrating the configuration of the information processing apparatus according to the first embodiment. As illustrated in FIG. 2, an information processing apparatus 100 includes a communication unit 110, an input unit 120, a display unit 130, a storage unit 140, and a control unit 150.

The communication unit 110 is a communication device that receives data from another device via a network. For example, the communication unit 110 receives the question sentence data F1 from the other device and outputs the received question sentence data F1 to the control unit 150.

The input unit 120 is an input device for inputting various kinds of information to the information processing apparatus 100. For example, the input unit 120 corresponds to a keyboard, a mouse, a touch panel, or the like. The information processing apparatus 100 may also accept the question sentence data F1 via the input unit 120.

The display unit 130 is a display device that displays information output from the control unit 150. The display unit 130 corresponds to a liquid crystal display, a touch panel, or the like.

The storage unit 140 includes a question sentence database (DB) 140a, a general sentence DB 140b, the text HMM 140c, an answer sentence DB 140d, a static dictionary information 140e, and a dynamic dictionary information 140f. The storage unit 140 corresponds to a semiconductor memory device, such as a random access memory (RAM), a read only memory (ROM), or a flash memory, or a storage device, such as a hard disk drive (HDD).

The question sentence DB 140a is a database that stores therein the question sentence data F1. FIG. 3 is a diagram illustrating an example of the data structure of the question sentence DB according to the first embodiment. As illustrated in FIG. 3, this question sentence DB associates each of the question text numbers and the text content (question sentence data). The question text number is information for uniquely identifying a group of a plurality of texts that are included in the question text. The text content indicates the content of each of the texts associated with the question text numbers.

The general sentence DB 140b is a database that stores therein general sentences that do not have any feature in various types of texts. For example, a general sentence is a sentence, such as "Thank you for your continued business", "Please let me know the cause and a coping method", or the like. It is assumed that the general sentences are previously set in the general sentence DB 140b.

The text HMM 140c is information that associates answer sentences with information on the texts that are highly likely to co-occur with the text that is associated with the question sentence. In a description below, as appropriate, the text associated with the question sentence is appropriately referred to as a "question text". In the first embodiment, as an example, it is assumed that a question text and the other texts are included in the text content in the question sentence DB 140a.

FIG. 4 is a diagram illustrating an example of the data structure of the text HMM according to the first embodiment. As illustrated in FIG. 4, the text HMM 140c associates the text vectors with a plurality of co-occurrence text vectors. The text vectors in the text HMM 140c are the text vectors calculated from the answer sentences (texts of the answer sentences) and an answer sentence is determined based on the text vectors.

A co-occurrence text vector is associated with a co-occurrence rate. The co-occurrence text vector is the vector obtained from the text that co-occurs with the question text that is included in the question sentence data. The co-occurrence rate indicates the probability that the text of the subject text vector co-occurs with the question text. For example, if the answer sentence that is associated with a certain question text is the answer sentence A2, it is indicated that the possibility that the question text and the text (text of the text vector "Dα108F97") co-occur is "37%".

Figures 5, 6:
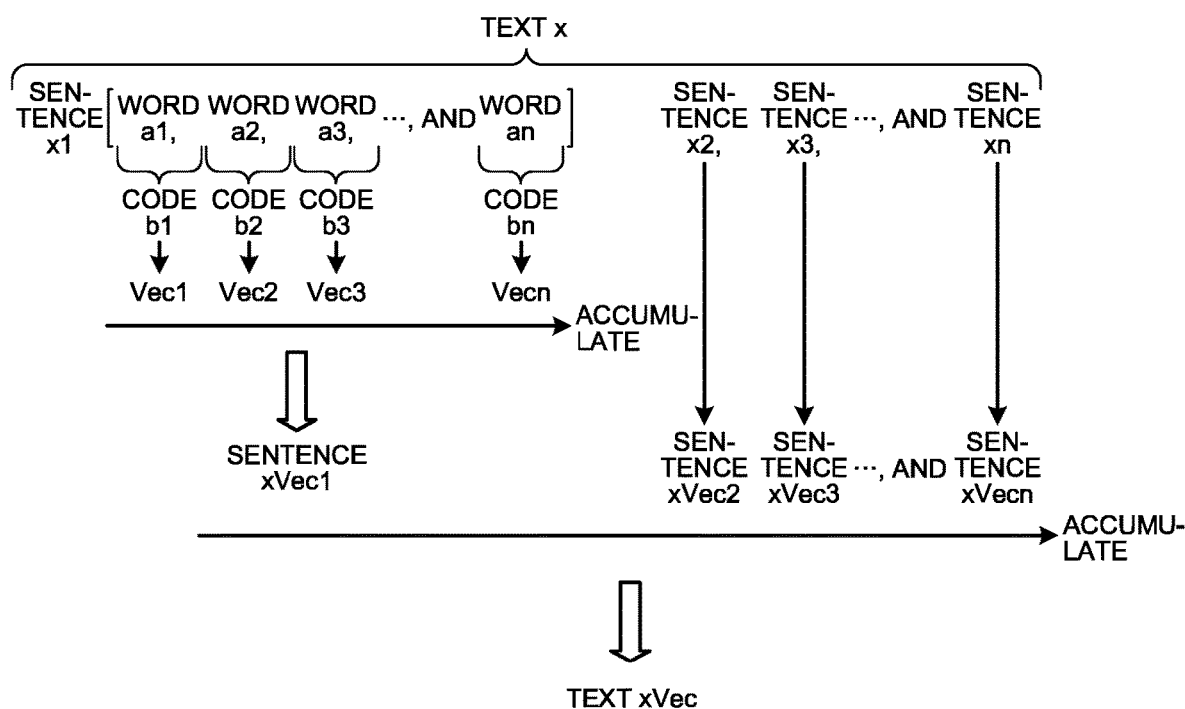
FIG. 5 is a diagram illustrating an example of the data structure of an answer sentence DB according to the first embodiment.
FIG. 6 is a diagram illustrating an example of a process of calculating text vectors.

The answer sentence DB 140d is a database that associates the text vector of the answer sentence with the answer sentence. FIG. 5 is a diagram illustrating an example of the data structure of an answer sentence DB according to the first embodiment. As illustrated in FIG. 5, the text vectors are associated with the answer sentences. The text vector is the text vector calculated from the answer sentence. The answer sentence indicates the content of the answer sentence. Here, as an example, an answer sentence is assumed to be a text; however, an answer sentence may also be a sentence.

The static dictionary information 140e is information that is used to associate words with static codes.

The dynamic dictionary information 140f is information that is used to allocate dynamic codes to words (or character strings) that are not defined in the static dictionary information 140e.

A description will be given here by referring back to FIG. 2. The control unit 150 includes an accepting unit 150a, an extracting unit 150b, a specifying unit 150c, and an output unit 150d. The control unit 150 can be implemented by a central processing unit (CPU), a micro processing unit (MPU), or the like. Furthermore, the control unit 150 may also be implemented by hard-wired logic, such as an application specific integrated circuit (ASIC) or a field programmable gate array (FPGA).

The accepting unit 150a accepts the question sentence data F1 from the communication unit 110 or the input unit 120. The accepting unit 150a registers the accepted question sentence data in the question sentence DB 140a.

The extracting unit 150b is a processing unit that acquires the question sentence data from the question sentence DB 140a and that extracts the feature text data based on each text included in the question sentence data and based on the sentences registered in the general sentence DB 140b. The extracting unit 150b outputs the feature text data to the specifying unit 150c.

For example, the extracting unit 150b compares each sentence in each text included in the question sentence data with the general sentences stored in the general sentence DB 140b and extracts the feature text data from the question sentence data.

The specifying unit 150c is a processing unit that specifies the answer sentence associated with the question text based on the feature text data and the text HMM 140c. For example, after having performed the process of calculating the text vector of each of the texts included in the feature text data, the specifying unit 150c specifies an answer sentence based on each of the text vectors and the text HMM 140c.

An example of a process of calculating text vectors performed by the specifying unit 150c will be described. FIG. 6 is a diagram illustrating an example of the process of calculating the text vectors. In FIG. 6, as an example, a description will be given of a process of calculating the text vector of the text x.

For example, in the text x, the sentence x1, the sentence x2, the sentence x3, . . . , and the sentence xn are included. The specifying unit 150c calculates the sentence vector xVec1 of the sentence x1 as follows. The specifying unit 150c encodes each of the words included in the sentence x1 by using the static dictionary information 140e and the dynamic dictionary information 140f.

For example, if a hit occurs in the word in the static dictionary information 140e, the specifying unit 150c specifies the static code of the word and replaces the word with the specified static code, thereby performing encoding. If a hit does not occur in the word in the static dictionary information 140e, the specifying unit 150c specifies a dynamic code by using the dynamic dictionary information 140f. For example, if the word is not registered in the dynamic dictionary information 140f, the specifying unit 150c registers the word in the dynamic dictionary information 140f and obtains the dynamic code that is associated with the registration position. If the word has been registered in the dynamic dictionary information 140f, the specifying unit 150c obtains the dynamic code associated with the registration position of the registered word. The specifying unit 150c performs encoding by replacing the word with the specific dynamic code.

In the example illustrated in FIG. 6, the specifying unit 150c performs encoding by replacing a word al to a word an with a code b1 to a code bn, respectively.

After having encoded each of the words, the specifying unit 150c calculates a word vector of each of the words (codes) based on the Word2Vec technology. The Word2Vec technology is used to perform a process of calculating a vector of each code based on the relationship between a certain word (code) and the other words (codes) adjacent to the certain word. In the example illustrated in FIG. 6, the specifying unit 150c calculates the word vectors Vec1 to Vecn of the code b1 to code bn, respectively. By accumulating the word vectors Vec1 to Vecn, the specifying unit 150c calculates the sentence vector xVec1 of the sentence x.

As described above, the specifying unit 150c calculates the sentence vector xVec1 of the sentence x1. By performing the same process on the sentence x2 to the sentence nx, the specifying unit 150c also calculates sentence vectors xVec2 to xVecn.

By accumulating the sentence vectors xVec1 to xVecn, the specifying unit 150c calculates the text vector "xVec" of the text x. By also performing the same process on the text y and the other texts, the specifying unit 150c calculates the text vector "yVec" of the text y and the text vector "nVec" of the other text.

In the following, a description will be given of an example of a process in which the specifying unit 150c specifies, based on each of the text vectors and the text HMM 140c, an answer sentence associated with the question text. The specifying unit 150c compares the text vectors of the texts that co-occur with the question text with the co-occurrence text vectors in the text HMM 140c and then specifies the co-occurrence text vector that is matched with (or similar to) the text vector. Furthermore, the specifying unit 150c may also specify the co-occurrence text vector in which the distance between the text vector and the co-occurrence text vector is less than a threshold as the matched co-occurrence text vector.

The specifying unit 150c specifies the text vector associated with the specified co-occurrence text vector. The specifying unit 150c outputs the specified text vector to the output unit 150d.

For example, in FIG. 4, if the text vector of the text that co-occurs with the question text is "Dα108F97", the specifying unit 150c specifies the "text vector of the answer sentence A2".

If a plurality of co-occurrence text vectors matched with the text vector is present, the specifying unit 150c may also select the co-occurrence text vector in which the co-occurrence rate is the maximum or may also select the co-occurrence text vector based on another selection policy.

The output unit 150d is a processing unit that detects, from the answer sentence DB 140d, the answer sentence associated with the text vector received from the specifying unit 150c and that outputs information on the detected answer sentence. The output unit 150d may also display the answer sentence data on the display unit 130 or may also send the answer sentence to the transmission source of the question sentence data. Furthermore, when the output unit 150d sends the answer sentence data, the output unit 150d may also send the answer sentence data after having encoded the answer sentence data based on the static dictionary information 140e and the dynamic dictionary information 140f. The explanation of encoding the answer sentence data is the same as that of encoding the feature text data performed by the specifying unit 150c.

Figure 7:
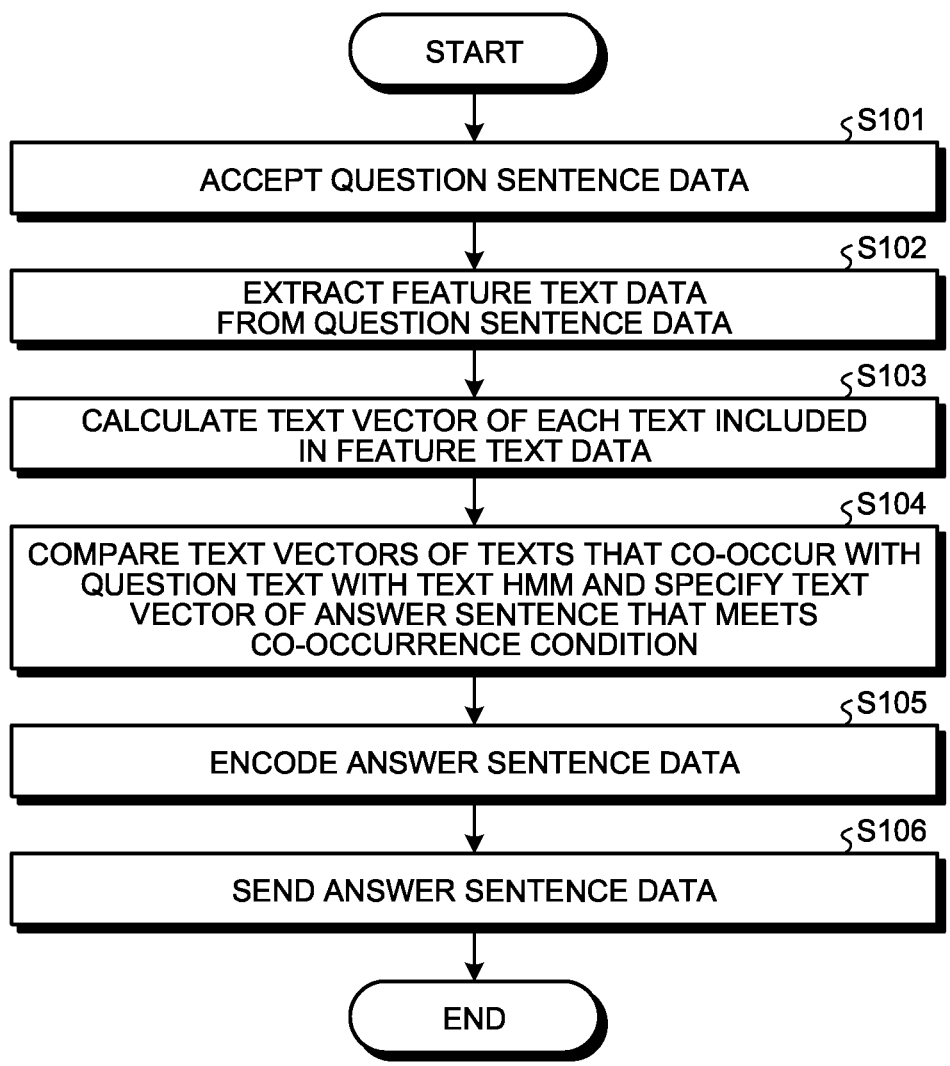
FIG. 7 is a flowchart illustrating the flow of a process performed by the information processing apparatus according to the first embodiment.

In the following, an example of the flow of the process performed by the information processing apparatus 100 according to the first embodiment will be described. FIG. 7 is a flowchart illustrating the flow of the process performed by the information processing apparatus according to the first embodiment. As illustrated in FIG. 7, the accepting unit 150a in the information processing apparatus 100 accepts the question sentence data (Step S101).

The extracting unit 150b in the information processing apparatus 100 extracts the feature text data from the question sentence data (Step S102).

The specifying unit 150c in the information processing apparatus 100 calculates the text vector of each of the texts included in the feature text data (Step S103). The specifying unit 150c compares the text vectors of the texts that co-occur with the question text with the text HMM 140c and specifies the text vector of the answer sentence that meets a co-occurrence condition (Step S104).

The output unit 150d in the information processing apparatus 100 acquires the answer sentence data from the answer sentence DB 140d based on the text vector and encodes the answer sentence data (Step S105). The output unit 150d sends the answer sentence data (Step S106).

In the following, the effect of the information processing apparatus 100 according to the first embodiment will be described. The information processing apparatus 100 calculates the text vector of each of the texts included in the question sentence data, compares the text vectors of the texts that co-occur with the question text with the co-occurrence text vectors in the text HMM 140c, and specifies an answer sentence. In this way, the information processing apparatus 100 specifies the answer sentence based on the co-occurrence relation with the question text, thereby reducing the load applied to specify the text.

[b] Second Embodiment

Figure 8:
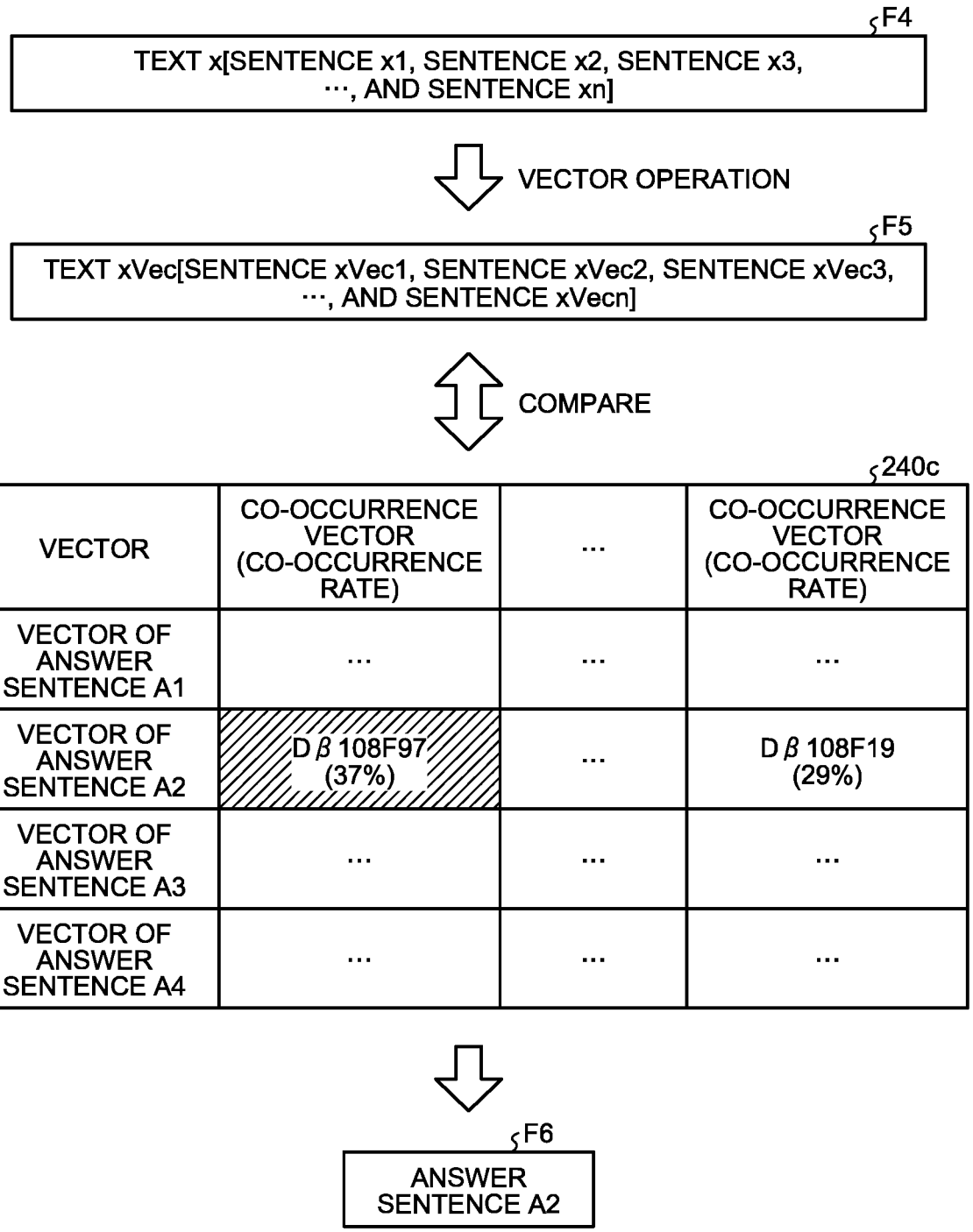
FIG. 8 is a diagram illustrating a process performed by an information processing apparatus according to a second embodiment.

FIG. 8 is a diagram illustrating a process performed by an information processing apparatus according to a second embodiment. When the information processing apparatus according to the second embodiment acquires question sentence data F4, the information processing apparatus specifies, based on the question sentence data F4 and a sentence HMM 240c, answer sentence data F6 associated with the question sentence data F4.

A single "text" is included in the question sentence data F4 according to the second embodiment. The text is formed of a plurality of "sentences". Furthermore, sentences are character strings separated by a period.

In an explanation of FIG. 8, for convenience of description, it is assumed that a text x is included in the question sentence data F4. Furthermore, it is assumed that the sentence x1 included in the text x is the sentence associated with a question sentence and it is assumed that the other sentences are the sentences other than the question sentence.

The information processing apparatus calculates a vector of each of the sentences included in the text x. For example, it is assumed that the vectors associated with the sentences x1 to the sentence xn are represented by xVec1 to xVecn, respectively. The process in which the information processing apparatus calculates the vector associated with each of the sentence x1 to the sentence xn is the same as the process in which the information processing apparatus 100 calculates the vectors of the sentences described in the first embodiment. The information processing apparatus creates vector data F5 by performing the process described above.

By comparing the vectors of the sentences x2 to xn that co-occur with the sentence x1 included in the vector data F5 with the sentence HMM 240c, the information processing apparatus specifies the answer sentence associated with the sentence x1.

The sentence HMM 240c associates the vectors with a plurality of co-occurrence vectors. The vectors in the sentence HMM 240c are the vectors calculated from the answer sentences (text of the answer sentences) and the answer sentence is determined based on the vectors. The co-occurrence vector is a vector obtained from the sentence that co-occurs with the sentence that is included in the question sentence data F4.

A co-occurrence vector is associated with a co-occurrence rate. For example, if the answer sentence of the sentence x in the question sentence data F4 is the answer sentence A2, it is indicated that possibility that the vector of the sentence that co-occurs with the sentence x1 becomes "Dβ108F97" is "37%" and the possibility that the vector of the sentence that co-occurs with the sentence x1 becomes "Dβ108F19" is "29%".

The information processing apparatus compares the vectors appearing before and after the xVec1 included in the vector data F5 with each of the co-occurrence vectors in the sentence HMM 240c and determines a hit record. For example, if the vector yVec1 is matched with (or similar to) the co-occurrence vector "Dβ108F97", the information processing apparatus specifies the answer sentence A2 as the answer sentence of the sentence x1.

As described above, the information processing apparatus calculates a vector of each of the sentences included in the question sentence data F4, compares the vectors of the sentences that co-occur with the sentence associated with the question sentence with the co-occurrence vectors in the sentence HMM 240c, and specifies the answer sentence. The information processing apparatus specifies the answer sentence based on the co-occurrence relation with the sentence of the question sentence in the question sentence data F4, thereby reducing the load applied to specify the sentence.

Figure 9:
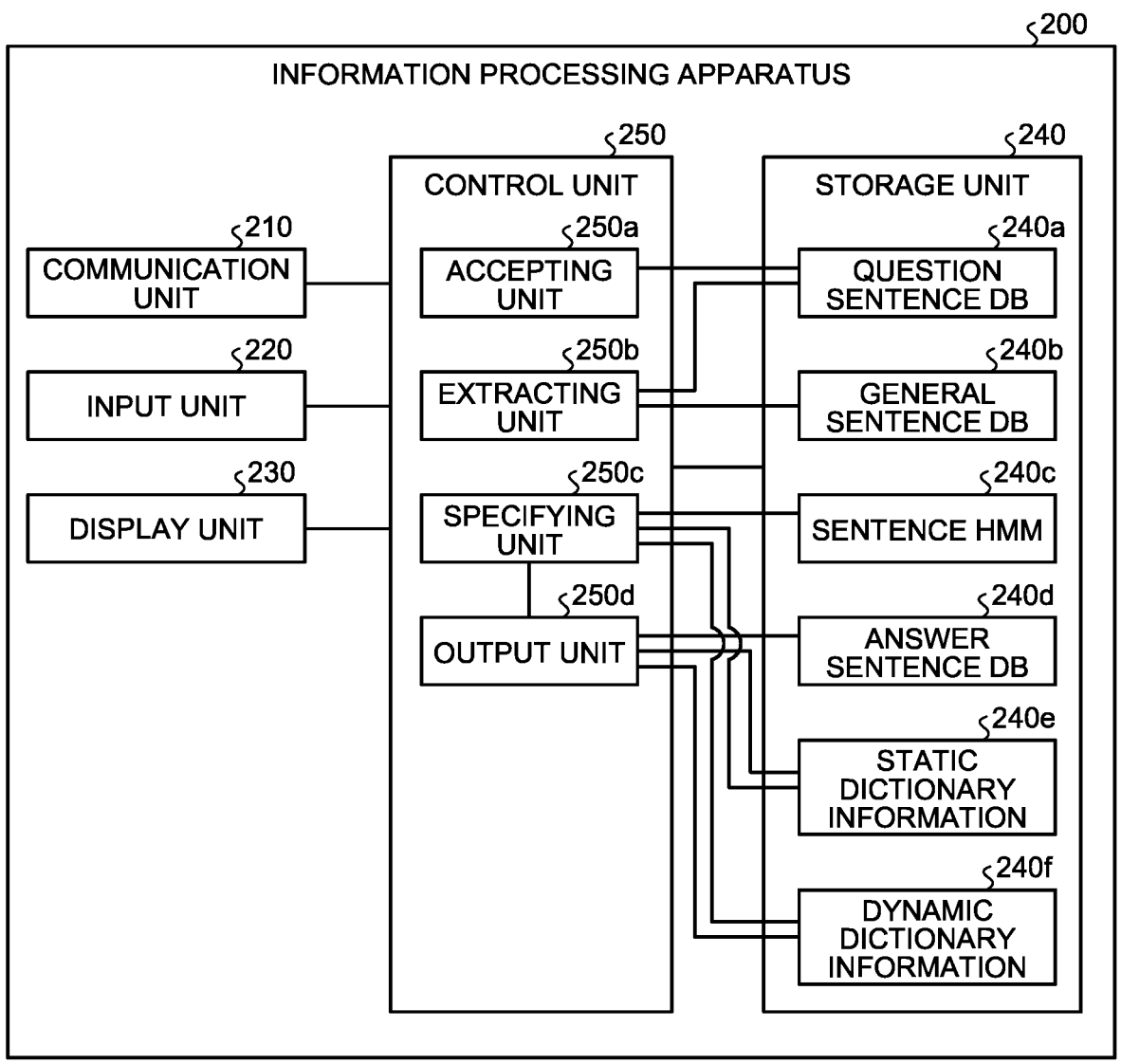
FIG. 9 is a functional block diagram illustrating the configuration of the information processing apparatus according to the second embodiment.

In the following, the configuration of the information processing apparatus according to the second embodiment will be described. FIG. 9 is a functional block diagram illustrating the configuration of the information processing apparatus according to the second embodiment. As illustrated in FIG. 9, an information processing apparatus 200 includes a communication unit 210, an input unit 220, a display unit 230, a storage unit 240, and a control unit 250.

The communication unit 210 is a communication device that receives data from another device via a network. For example, the communication unit 210 receives the question sentence data F4 from the other device and outputs the received question sentence data F4 to the control unit 250.

The input unit 220 is an input device for inputting various kinds of information to the information processing apparatus 200. For example, the input unit 220 corresponds to a keyboard, a mouse, a touch panel, or the like. The information processing apparatus 200 may also accept the question sentence data F4 via the input unit 220.

The display unit 230 is a display device that displays information output from the control unit 250. The display unit 230 corresponds to a liquid crystal display, a touch panel, or the like.

The storage unit 240 includes a question sentence DB 240a, a general sentence DB 240b, the sentence HMM 240c, an answer sentence DB 240d, a static dictionary information 240e, and a dynamic dictionary information 240f. The storage unit 240 corresponds to a semiconductor memory device, such as a RAM, a ROM, or a flash memory, or a storage device, such as an HDD.

The question sentence DB 240a is a database that stores therein the question sentence data F4. For example, the question sentence DB 240a stores therein, in an associated manner, the question text numbers and question sentence data.

The general sentence DB 240b is a DB that stores therein general sentences. An explanation of the general sentence DB 240b corresponds to the explanation of the general sentence DB 140b described in the first embodiment.

The sentence HMM 240c is information that associates answer sentences with information on the sentences that are highly likely to co-occur with the sentence that is associated with the question sentence. In a description below, as appropriate, a sentence associated with a question sentence is simply referred to as a "question sentence". In the second embodiment, as an example, it is assumed that the question sentence and the other sentences are included in the question sentence DB 240a.

FIG. 10 is a diagram illustrating an example of the data structure of the sentence HMM according to the second embodiment. As illustrated in FIG. 10, the sentence HMM 240c associates the vectors with a plurality of co-occurrence vectors. The vectors in the sentence HMM 240c are the vectors calculated from the answer sentences (sentences of the answer sentences) and an answer sentence is determined based on the vectors.

A co-occurrence vector is associated with a co-occurrence rate. The co-occurrence vector is the vector obtained from the sentence that co-occurs with the question sentence that is included in the question sentence data. The co-occurrence rate indicates the probability that the sentence of the subject vector co-occurs with the question sentence. For example, if the answer sentence associated with a certain question sentence is the answer sentence A2, it is indicated that the possibility that the question sentence and the sentence (sentence of the vector "Dβ108F97") co-occur is "37%".

The answer sentence DB 240d is a database that associates the vector of the answer sentence with the answer sentence.

The explanations about the static dictionary information 240e and the dynamic dictionary information 240f are the same as those about the static dictionary information 140e and the dynamic dictionary information 140f described in the first embodiment.

The control unit 250 includes an accepting unit 250a, an extracting unit 250b, a specifying unit 250c, and an output unit 250d. The control unit 250 can be implemented by a CPU, an MPU, or the like. Furthermore, the control unit 250 can also be implemented by hard-wired logic, such as an ASIC or an FPGA.

The accepting unit 250a accepts the question sentence data F4 from the communication unit 210 or the input unit 220. The accepting unit 250a registers the accepted question sentence data in the question sentence DB 240a.

The extracting unit 250b is a processing unit that acquires the question sentence data from the question sentence DB 240a and that extracts the feature sentence data based on each of the sentences included in the question sentence data and based on the sentences registered in the general sentence DB 240b. The extracting unit 250b outputs the feature sentence data to the specifying unit 250c.

For example, the extracting unit 250b compares each of the sentences included in the question sentence data with the general sentences stored in the general sentence DB 240b and extracts the feature sentence data from the question sentence data.

The specifying unit 250c is a processing unit that specifies the answer sentence associated with the question sentence based on the feature sentence data and the sentence HMM 240c. For example, after having performed the process of calculating the vector of each of the sentences included in the feature sentence data, the specifying unit 250c specifies an answer sentence based on each of the vectors and the sentence HMM 240c.

A description will be given of an example of a process in which the specifying unit 250c calculates a vector of a sentence. For example, the process in which the specifying unit 250c calculates a vector of a sentence is the same as the process in which the specifying unit 150c calculates the vector xVec1 of the sentence x1 described in FIG. 6.

A description will be given of an example of a process in which the specifying unit 250c specifies the answer sentence associated with the question sentence based on the vector of each of the sentences and the sentence HMM 240c. The specifying unit 250c compares the vectors of the sentences that co-occur with the question sentence with the co-occurrence vectors in the sentence HMM 240c and specifies the co-occurrence vector that is matched with (or similar to) the vector. Furthermore, the specifying unit 250c may also specify the co-occurrence vector in which the distance between the vector and the co-occurrence vector is less than a threshold as the matched co-occurrence vector.

The specifying unit 250c specifies the vector associated with the specified co-occurrence vector. The specifying unit 250c outputs the specified vector to the output unit 250d.

For example, in FIG. 10, if the vector of the sentence that co-occurs with the question sentence is "Dβ108F97", the specifying unit 250c specifies the "vector of the answer sentence A2".

If a plurality of co-occurrence vectors matched with the vector is present, the specifying unit 250c may also select the co-occurrence vector in which the co-occurrence rate is the maximum or may also select the co-occurrence vector based on the other selection policy.

The output unit 250d is a processing unit that detects, from the answer sentence DB 240d, the answer sentence associated with the vector accepted from the specifying unit 250c and that outputs the information on the detected answer sentence. The output unit 250d may also display the answer sentence data on the display unit 230 or may also send the answer sentence data to the transmission source of the question sentence data. Furthermore, when the output unit 250d sends the answer sentence data, the output unit 250d may also send the answer sentence data after having encoded the answer sentence data based on the static dictionary information 240e and the dynamic dictionary information 240f. The explanation of encoding the answer sentence data is the same as the explanation of encoding the feature sentence data performed by the specifying unit 250c.

Figure 11:
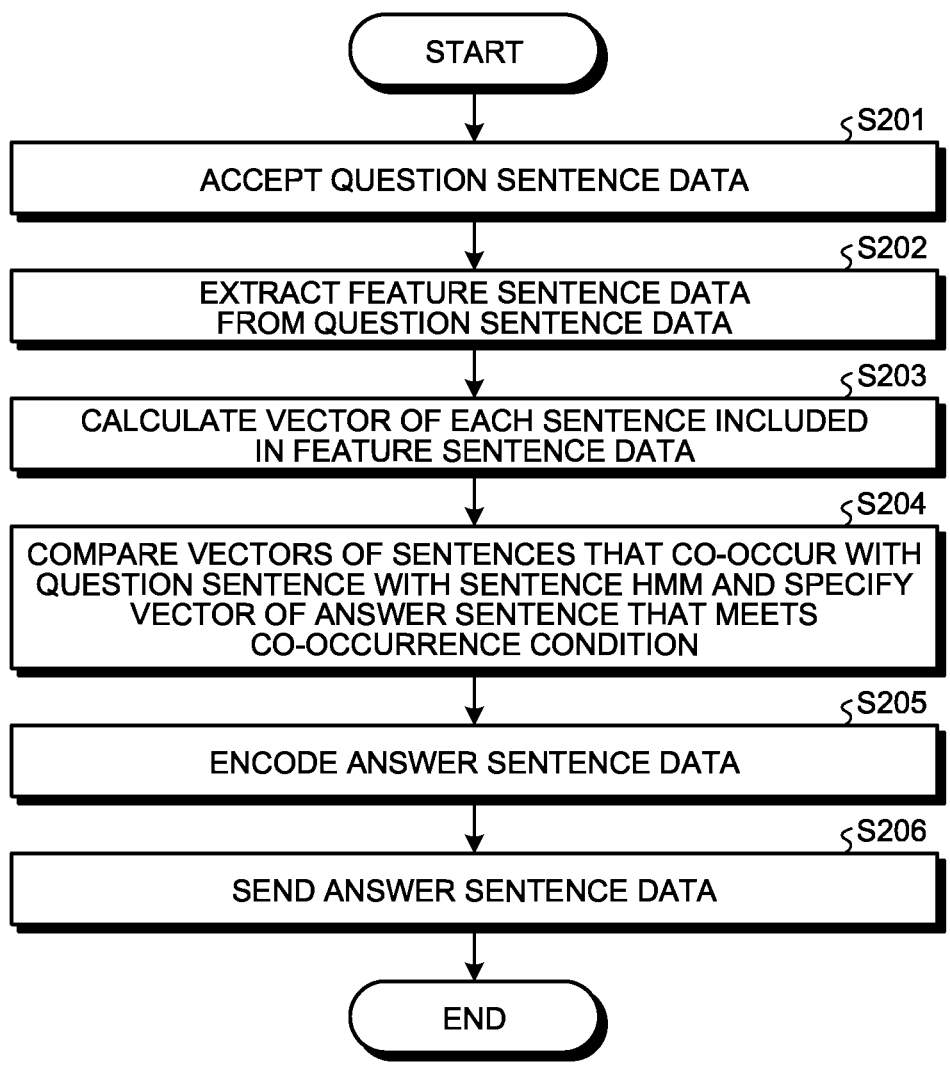
FIG. 11 is a flowchart illustrating the flow of a process performed by the information processing apparatus according to the second embodiment.

In the following, an example of the flow of the process performed by the information processing apparatus 200 according to the second embodiment will be described. FIG. 11 is a flowchart illustrating the flow of the process performed by the information processing apparatus according to the second embodiment. As illustrated in FIG. 11, the accepting unit 250a in the information processing apparatus 200 accepts the question sentence data (Step S201).

The extracting unit 250b in the information processing apparatus 200 extracts the feature sentence data from the question sentence data (Step S202).

The specifying unit 250c in the information processing apparatus 200 calculates the vector of each of the sentences included in the feature sentence data (Step S203). The specifying unit 250c compares the vectors of the sentences that co-occur with the question sentence with the sentence HMM 240c and specifies the vector of the answer sentence that meets the co-occurrence condition (Step S204).

The output unit 250d in the information processing apparatus 200 acquires the answer sentence data from the answer sentence DB 240d based on the vector and encodes the answer sentence data (Step S205). The output unit 250d sends the answer sentence data (Step S206).

In the following, the effect of the information processing apparatus 200 according to the second embodiment will be described. The information processing apparatus 200 calculates the vector of each of the sentences included in the question sentence data, compares the vectors of the sentences that co-occur with the question sentence with the co-occurrence vector in the sentence HMM 240c, and specifies the answer sentence. In this way, the information processing apparatus 200 specifies the answer sentence based on the co-occurrence relation with the question sentence, thereby reducing the load applied to specify the sentence.

[c] Third Embodiment

Figure 12:
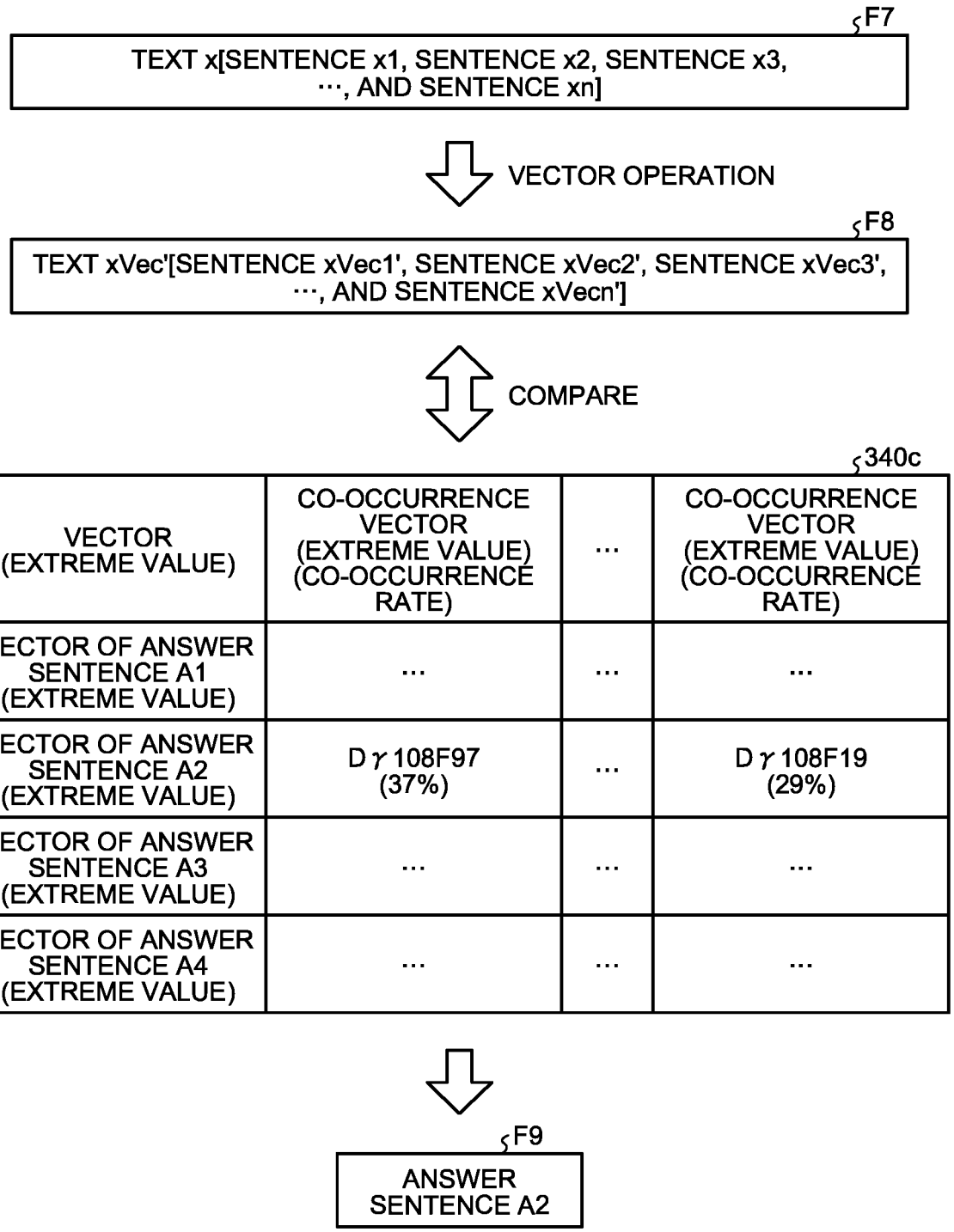
FIG. 12 is a diagram illustrating a process performed by an information processing apparatus according to a third embodiment.

FIG. 12 is a diagram illustrating a process performed by an information processing apparatus according to a third embodiment. When an information processing apparatus according to the third embodiment acquires question sentence data F7, the information processing apparatus specifies answer sentence data F9 associated with the question sentence data F7 based on the question sentence data F7 and a sentence HMM 340c.

A single "text" is included in the question sentence data F7 according to the third embodiment. The text is formed of a plurality of "sentences". Furthermore, the sentences are character strings separated by periods.

In an explanation of FIG. 12, for convenience of description, it is assumed that the text x is included in the question sentence data F7. Furthermore, it is assumed that the sentence x1 included in the text x is the sentence associated with the question sentence and it is assumed that the other sentences are the sentences other than the question sentence.

The information processing apparatus calculates the vector (extreme value) of each of the sentences included in the text x. For example, the vectors (extreme values) associated with the sentence x1 to the sentence xn are represented by xVec1' to xVecn', respectively. The process in which the information processing apparatus calculates the vector (extreme value) associated with each of the sentence x1 to the sentence xn is as follows.

For example, the information processing apparatus calculates the word vector of each of the words (codes) included in the sentence x1 based on the Word2Vec technology. The information processing apparatus selects the word vectors associated with a predetermined "extreme value" from among the plurality of calculated word vectors and accumulates the selected word vectors associated with the extreme values, thereby calculating the vector xVec1' of the sentence x1. The information processing apparatus also calculates the vectors xVec2' to the xVecn' of the other sentences x2 to xn, respectively. The information processing apparatus creates vector data F8 by performing the process described above.

By comparing the vectors (extreme values) of the sentence x2 to the sentence xn that co-occur with the sentence x1 included in the vector data F8 with the sentence HMM 340c, the information processing apparatus specifies the vectors (extreme values) of the answer sentence associated with the sentence x1.

The sentence HMM 340c associates the vectors (extreme values) with a plurality of co-occurrence vectors (extreme values). The vectors (extreme values) in the sentence HMM 340c are the vectors (extreme values) calculated from the answer sentences (texts of the answer sentences) and the answer sentence is determined based on the vectors (extreme values). The co-occurrence vectors (extreme values) are the vectors (extreme values) obtained from the sentences that co-occur with the sentences included in the question sentence data F7.

A co-occurrence vector (extreme value) is associated with a co-occurrence rate. For example, if the answer sentence of the sentence x in the question sentence data F7 is the answer sentence A2, the possibility that the vector (extreme value) of the sentence that co-occurs with the sentence x1 becomes "Dγ108F97" is "37%" and the possibility that the vector (extreme value) of the sentence that co-occurs with the sentence x1 becomes "Dγ108F19" is "29%".

The information processing apparatus compares the vectors (extreme values) appearing before and after the vector xVec1' included in the vector data F8 with each of the co-occurrence vectors (extreme values) in the sentence HMM 340c and determines a hit record. For example, if the vector yVec1' is matched with (or similar to) the co-occurrence vector (extreme value) "Dγ108F9", the information processing apparatus specifies the answer sentence A2 as the answer sentence of the sentence x1.

As described above, the information processing apparatus calculates the vector (extreme value) of each of the sentences included in the question sentence data F7, compares the vectors (extreme values) of the sentences that co-occur with the sentence associated with the question sentence with co-occurrence vectors (extreme values) in the sentence HMM 340c, and specifies the answer sentence. The information processing apparatus specifies the answer sentence based on the co-occurrence relation with the sentences of the question sentence in the question sentence data F7, thereby reducing the load applied to specify the sentence. Furthermore, by using the extreme values of the vectors, it is also possible to further reduce a calculation load.

In an explanation about the third embodiment below, an extreme value of a vector is simply referred to as a "vector".

Figure 13:
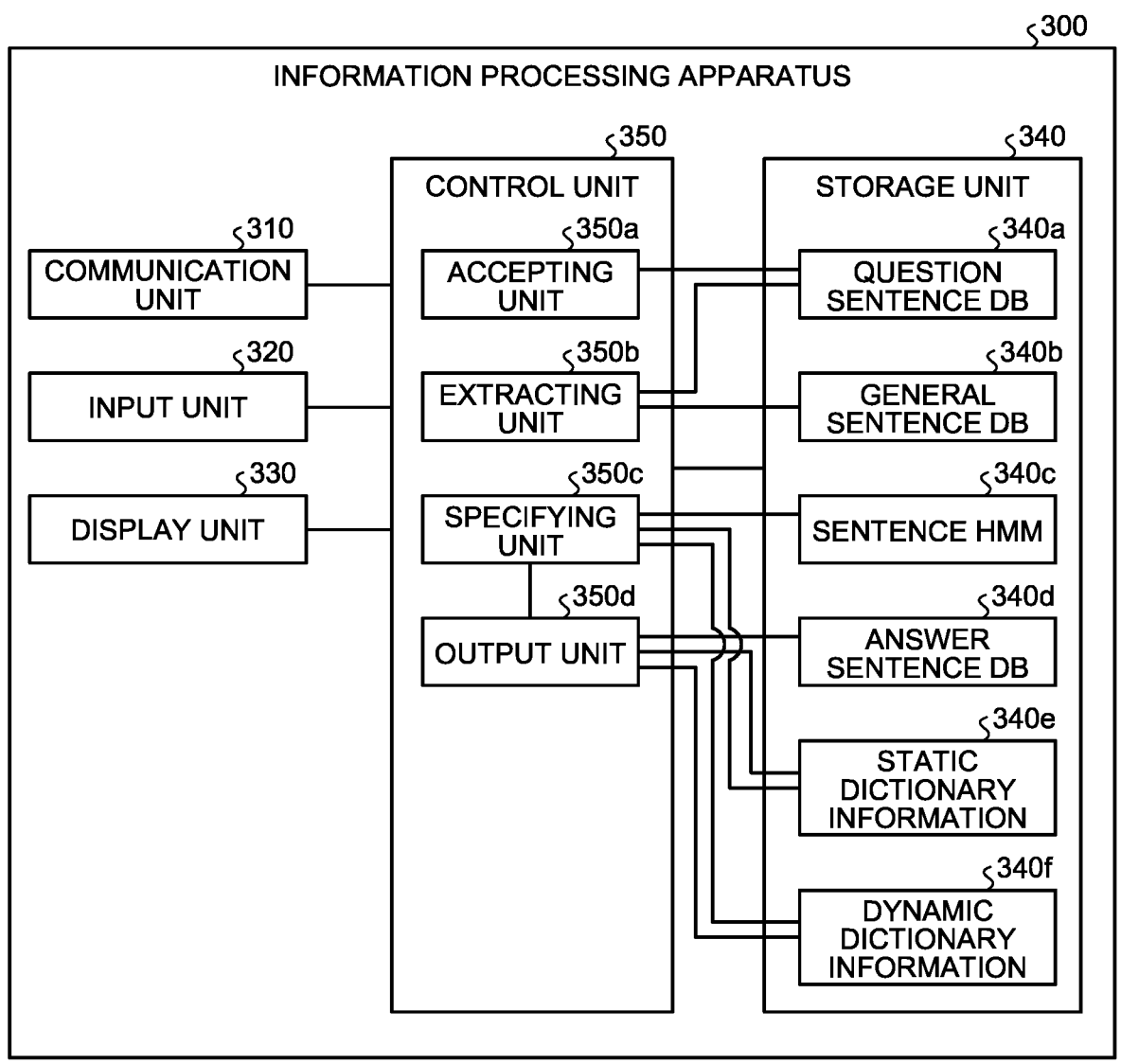
FIG. 13 is a functional block diagram illustrating the configuration of the information processing apparatus according to the third embodiment.

In the following, the configuration of an information processing apparatus according to the third embodiment will be described. FIG. 13 is a functional block diagram illustrating the configuration of the information processing apparatus according to the third embodiment. As illustrated in FIG. 13, an information processing apparatus 300 includes a communication unit 310, an input unit 320, a display unit 330, a storage unit 340, and a control unit 350.

The communication unit 310 is a communication device that receives data from another device via a network. For example, the communication unit 310 receives question sentence data F7 from the other device and outputs the received question sentence data F7 to the control unit 350.

The input unit 320 is an input device for inputting various kinds of information to the information processing apparatus 300. For example, the input unit 320 corresponds to a keyboard, a mouse, a touch panel, of the like. The information processing apparatus 300 may also accepts the question sentence data F7 via the input unit 320.

The display unit 330 is a display device that displays information that is output from the control unit 350. The display unit 330 corresponds to a liquid crystal display, a touch panel, or the like.

The storage unit 340 includes a question sentence DB 340a, a general sentence DB 340b, the sentence HMM 340c, an answer sentence DB 340d, a static dictionary information 340e, and a dynamic dictionary information 340f. The storage unit 340 corresponds to a semiconductor memory device, such as a RAM, a ROM, or a flash memory, or a storage device, such as an HDD.

The question sentence DB 340a is a database that stores therein the question sentence data F7. For example, the question sentence DB 340a stores therein, in an associated manner, the question text numbers and the question sentence data.

The general sentence DB 340b is a database that stores therein general sentences. An explanation of the general sentence DB 340b corresponds to the explanation of the general sentence DB 140b described in the first embodiment.

The sentence HMM 340c is information that associates the answer sentences with the information on the sentences that are highly likely to co-occur with the sentence that is associated with the question sentence. In a description below, as appropriate, the sentence associated with a question sentence is simply referred to as a "question sentence". In the third embodiment, as an example, it is assumed that the question sentence and other sentences are included in the question sentence DB 340a.

Figures 14, 15:
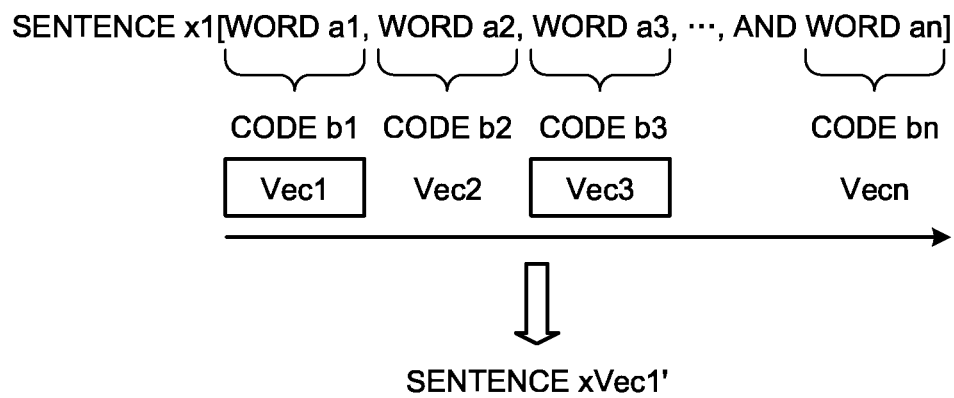
FIG. 14 is a diagram illustrating an example of the data structure of a sentence HMM according to the third embodiment.
FIG. 15 is a diagram illustrating an example of a process of calculating vectors (extreme values) of a sentence.

FIG. 14 is a diagram illustrating an example of the data structure of the sentence HMM according to the third embodiment. As illustrated in FIG. 14, the sentence HMM 340c associates the vectors with a plurality of co-occurrence vectors. The vectors in the sentence HMM 340c are vectors calculated from answer sentences (sentences of answer sentences) and an answer sentence is determined based on the vectors.

A co-occurrence vector is associated with a co-occurrence rate. The co-occurrence vector is the vector from the sentence that co-occurs with the question sentence included in the question sentence data. The co-occurrence rate indicates the probability that the sentence of the subject vector co-occurs with the question sentence. For example, if the answer sentence associated with a certain question sentence is the answer sentence A2, it is indicated that the possibility that the question sentence and the sentence (sentence of the vector "Dγ108F97") co-occur is "37%".

The answer sentence DB 240d is a database that associates the vector of the answer sentence with the answer sentence.

The explanations about the static dictionary information 340e and the dynamic dictionary information 340f are the same as those about the static dictionary information 140e and the dynamic dictionary information 140f described in the first embodiment.

The control unit 350 includes an accepting unit 350a, an extracting unit 350b, a specifying unit 350c, and an output unit 350d. The control unit 350 can be implemented by a CPU, an MPU, or the like. Furthermore, the control unit 250 can also be implemented by hard-wired logic, such as an ASIC or an FPGA.

The accepting unit 350a accepts the question sentence data F7 from the communication unit 310 or the input unit 320. The accepting unit 350a registers the accepted question sentence data F7 in the question sentence DB 340a.

The extracting unit 350b is a processing unit that acquires the question sentence data from the question sentence DB 340a and that extracts the feature sentence data based on each of the sentences included in the question sentence data and based on the sentences registered in the general sentence DB 340b. The extracting unit 350b outputs the feature sentence data to the specifying unit 350c.

For example, the extracting unit 350b compares each of the sentences included in the question sentence data with the general sentences stored in the general sentence DB 340b and extracts the feature sentence data from the question sentence data F7.

The specifying unit 350c is a processing unit that specifies the answer sentence associated with the question sentence based on the feature sentence data and the sentence HMM 340c. For example, after having performed the process of calculating the vector of each of the sentences included in the feature sentence data, the specifying unit 350c specifies an answer sentence based on each of the vectors and the sentence HMM 340c.

A description will be given of an example of a process in which the specifying unit 250c calculates a vector of a sentence. FIG. 15 is a diagram illustrating an example of the process of calculating vectors (extreme values) of a sentence. In FIG. 15, as an example, a process of calculating the vector (extreme value) xVec1' of the sentence x1 will be described.

For example, the word a1 to the word an are included in the sentence x1. The specifying unit 350c encodes each of the words included in the sentence x1 by using the static dictionary information 340e and the dynamic dictionary information 340f. The process of encoding the words is the same as the process of encoding the words performed by the specifying unit 150c described in the first embodiment. For example, the words a1 to an are encoded to the codes b1 to bn, respectively.

After having encoded each of the words, the specifying unit 350c calculates the word vector of each of the words (codes) based on the Word2Vec technology. The Word2Vec technology is used to perform a process of calculating the vector of each of the codes based on the relationship between a certain word (code) and the other words (codes) adjacent to the subject word. In the example illustrated in FIG. 15, the specifying unit 350c calculates the word vectors Vec1 to Vecn of the code b1 to the code bn, respectively.

The specifying unit 350c selects the word vectors associated with the previously set extreme values from among the calculated word vectors. For example, the specifying unit 350c selects the word vectors that are matched with the extreme values or selects the word vectors in each of which the distance with the extreme value is less than the threshold. In the example illustrated in FIG. 15, the specifying unit 350c selects the word vectors Vec1 and Vec3 associated with the extreme values. The specifying unit 350c calculates the sentence vector xVec1' of the sentence x1 by accumulating the selected word vectors associated with the extreme values.

A description will be given of an example of a process in which the specifying unit 350c specifies the answer sentence associated with the question sentence based on the vector of each of the sentences and the sentence HMM 340c. The specifying unit 350c compares the vectors of the sentences that co-occur with the question sentence with the co-occurrence vectors in the sentence HMM 340c and specifies the co-occurrence vector that is matched with (or similar to) the vectors. Furthermore, the specifying unit 350c may also specify the co-occurrence vector in which the distance between the vector and the co-occurrence vector is less than a threshold as the matched co-occurrence vector.

The specifying unit 350c specifies the vector associated with the specified co-occurrence vector. The specifying unit 350c outputs the specified vector to the output unit 350d.

For example, in FIG. 14, if the vector of the sentence that co-occurs with the question sentence is "Dγ108F97", the specifying unit 350c specifies the "vector of the answer sentence A2".

If a plurality of co-occurrence vectors matches with the vector is present, the specifying unit 350c may also select the co-occurrence vector in which the co-occurrence rate is the maximum or may also select the co-occurrence vector based on the other selection policy.

The output unit 350d is a processing unit that detects, from the answer sentence DB 340d, the answer sentence associated with the vector accepted from the specifying unit 350c and that outputs the information on the detected answer sentence. The output unit 350d may also display the answer sentence data on the display unit 330 or may also send the answer sentence data to the transmission source of the question sentence data. Furthermore, when the output unit 350d sends the answer sentence data, the output unit 350d may also send the answer sentence data after having encoded the answer sentence data based on the static dictionary information 340e and the dynamic dictionary information 340f. The explanation of encoding the answer sentence data is the same as the explanation of encoding the feature sentence data performed by the specifying unit 350c.

Figure 16:
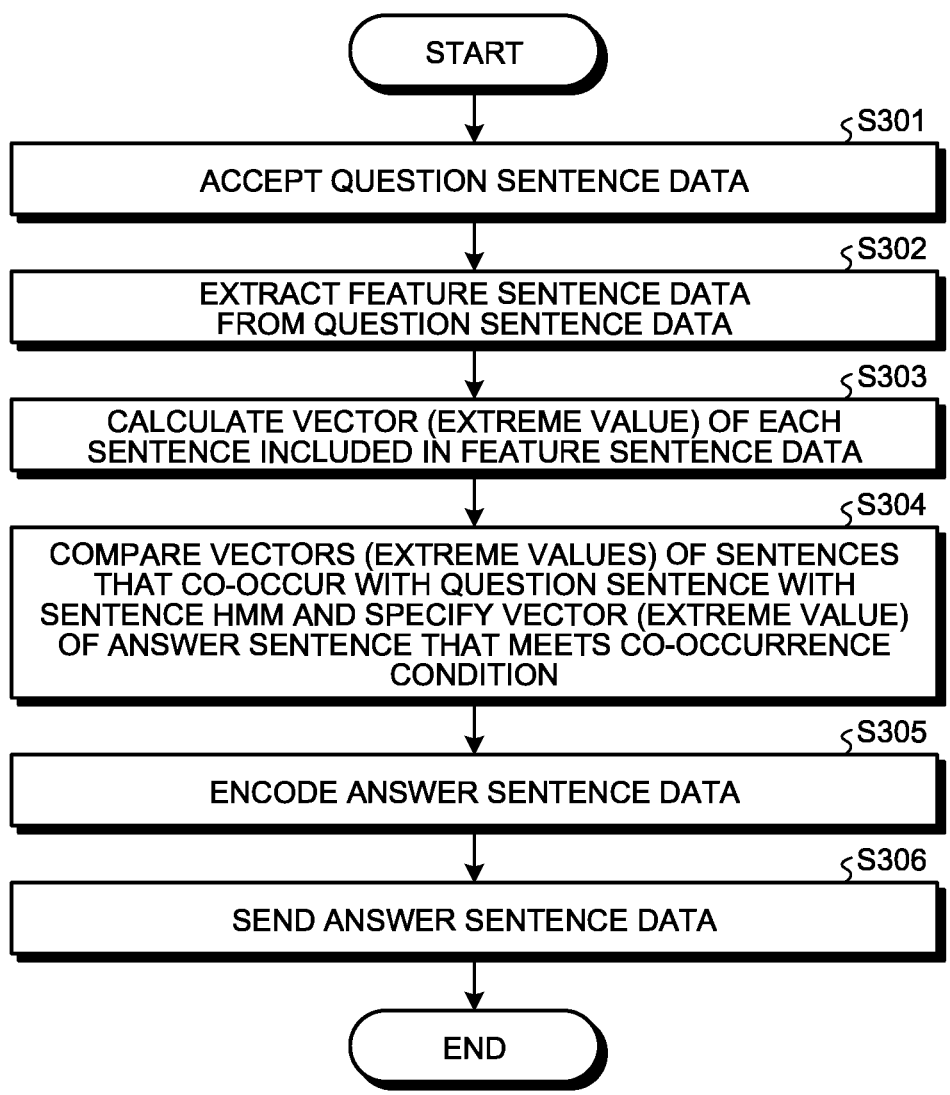
FIG. 16 is a flowchart illustrating the flow of a process performed by the information processing apparatus according to the third embodiment.

In the following, the flow of the process performed by the information processing apparatus 300 according to the third embodiment will be described. FIG. 16 is a flowchart illustrating the flow of the process performed by the information processing apparatus according to the third embodiment. As illustrated in FIG. 16, the accepting unit 350a in the information processing apparatus 300 accepts the question sentence data (Step S301).

The extracting unit 350b in the information processing apparatus 300 extracts the feature sentence data from the question sentence data (Step S302).

The specifying unit 350c in the information processing apparatus 300 calculates the vector (extreme value) of each of the sentences included in the feature sentence data (Step S303). The specifying unit 350c compares the vectors (extreme values) of the sentences that co-occur with the question sentence with the sentence HMM 340c and specifies the vector (extreme value) of the answer sentence that meets the co-occurrence condition (Step S304).

The output unit 350d in the information processing apparatus 300 acquires the answer sentence data from the answer sentence DB 340d based on the vector (extreme value) and encodes the answer sentence data (Step S305). The output unit 350d sends the answer sentence data (Step S306).

In the following, the effect of the information processing apparatus 300 according to the third embodiment will be described. The information processing apparatus 300 calculates the vector of each of the sentences included in the question sentence data, compares the vectors of the sentences that co-occur with the question sentence with the co-occurrence vectors in the sentence HMM 340c, and specifies the answer sentence. In this way, the information processing apparatus 300 specifies the answer sentence based on the co-occurrence relation with the question sentence, thereby reducing the load applied to specify the sentence. Furthermore, by using an extreme value of the vector, it is also possible to further reduce a calculation load.

Figure 17:
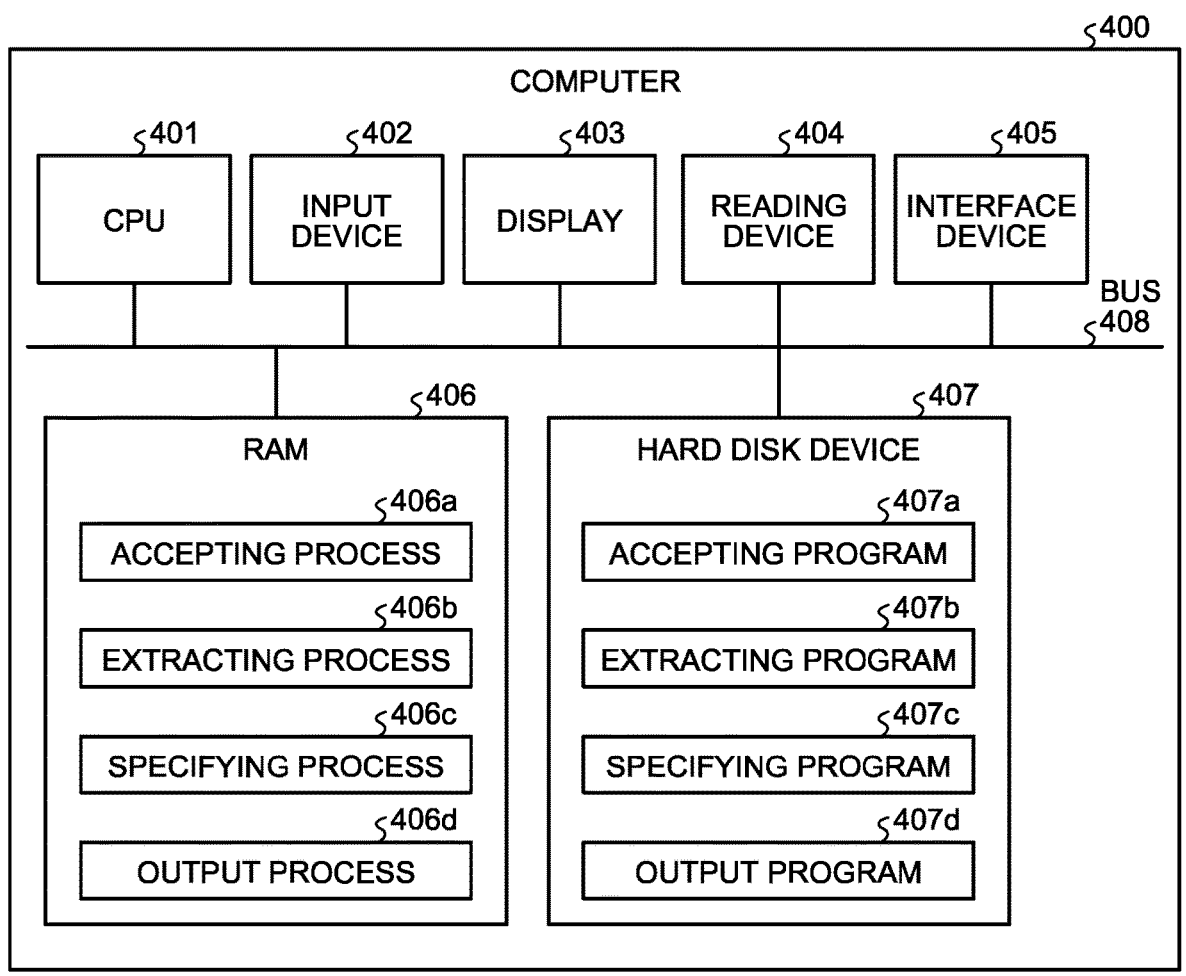
FIG. 17 is a diagram illustrating an example of the hardware configuration of a computer that implements the same function as that of the information processing apparatus.

In the following, a description will be given of an example of the hardware configuration of a computer that implements the same function as that performed by the information processing apparatus 100 (200 and 300) described in the embodiments. FIG. 17 is a diagram illustrating an example of the hardware configuration of the computer that implements the same function as that of the information processing apparatus.

As illustrated in FIG. 17, a computer 400 includes a CPU 401 that executes various kinds of arithmetic processing, an input device 402 that receives an input of data from a user, and a display 403. Furthermore, the computer 400 includes a reading device 404 that reads programs or the like from a storage medium and an interface device 405 that sends and receives data to and from another computer via a wireless network. Furthermore, the computer 400 includes a RAM 406 that temporarily stores therein various kinds of information and a hard disk device 407. Each of the devices 401 to 407 is connected to a bus 408.

The hard disk device 407 includes an accepting program 407a, an extracting program 407b, a specifying program 407c, and an output program 407d. The CPU 401 includes the accepting program 407a, the extracting program 407b, the specifying program 407c, and the output program 407d.

The accepting program 407a functions as an accepting process 406a. The extracting program 407b functions as an extracting process 406b. The specifying program 407c functions as a specifying process 406c. The output program 407d functions as an output process 406d.

The process of the accepting process 406a corresponds to the process performed by the accepting units 150a, 250a, and 350a. The process of the extracting process 406b corresponds to the process performed by the extracting units 150b, 250b, and 350b. The process of the specifying process 406c corresponds to the process performed by the specifying units 150c, 250c, and 350c. The process of the output process 406d corresponds to the process performed by the output units 150d, 250d, and 350d.

Furthermore, each of the programs 407a to 407d does not need to be stored in the hard disk device 407 in advance from the beginning. For example, each of the programs is stored in a "portable physical medium", such as a flexible disk (FD), a CD-ROM, a DVD disk, a magneto-optic disk, an IC CARD, that is to be inserted into the computer 400. Then, the computer 400 may also read and execute each of the programs 407a to 407d from the portable physical medium.

It is possible to reduce a load applied to specify a text.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable recording medium having stored therein a specifying program that causes a computer to execute a process comprising:
    accepting first vector information representing a first text including sentences first vector wherein the first vector information includes a first vector of a first sentence and another vector of another sentence wherein the first sentence and the other sentence are included in the first text;
    referring to a storage unit that stores therein information where a co-occurrence rate, a co-occurrence vector and second vector information representing a second text including sentences are associated with each other; and
    specifying the second vector information that is associated with, as indicated in the information stored in the storage unit, the co-occurrence vector that corresponds to the other vector, based on the co-occurrence rate that meets a standard.

2. The non-transitory computer readable recording medium according to claim 1, wherein
    the first vector is made from vectors respectively representing a plurality of words included in the first sentence, and
    the other vector is made from vectors respectively representing a plurality of words included in the other sentence.

3. The non-transitory computer readable recording medium according to claim 1, wherein
    the first vector is calculated by accumulating vectors selected from among vectors each representing a plurality of words included in the first sentence, based on extreme values of the vectors and a preset extreme value, and
    the other vector is calculated by accumulating vectors selected from among vectors each representing a plurality of words included in the other sentence, based on extreme values of the vectors and the preset extreme value.

4. A specifying method comprising:
    accepting first vector information representing a first text including sentences wherein the first vector information includes a first vector of a first sentence and another vector of another sentence wherein the first sentence and the other sentence are included in the first text, using the processor;
    referring to a storage unit that stores therein information where a co-occurrence rate a co-occurrence vector and vector information representing a second text including sentences are associated with each other, using the processor; and
    specifying the second vector information that is associated with, as indicated in the information stored in the storage unit, the co-occurrence vector that corresponds to the other vector, based on the co-occurrence rate that meets a standard, using the processor.

5. The specifying method according to claim 4, wherein
    the first vector is made from vectors respectively representing a plurality of words included in the first sentence, and
    the other vector is made from vectors respectively representing a plurality of words included in the other sentence.

6. The specifying method according to claim 4, wherein
    the first vector is calculated by accumulating vectors selected from among vectors each representing a plurality of words included in the first sentence, based on extreme values of the vectors and a preset extreme value, and
    the other vector is calculated by accumulating vectors selected from among vectors each representing a plurality of words included in the other sentence, based on extreme values of the vectors and the preset extreme value.

7. An information processing apparatus comprising:
    a memory that stores therein information where a co-occurrence rate, a co-occurrence vector and a second vector information representing a second text including sentences are associated with each other; and
    a processor coupled to the memory, wherein the processor executes a process comprising:
    accepting first vector information representing a first text including sentences wherein the first vector information includes a first vector of a first sentence and another vector of another sentence wherein the first sentence and the other sentence are included in the first text;
    referring to the memory; and
    specifying the second vector information that is associated with, as indicated in the information stored in the memory, the co-occurrence vector that corresponds to the other vector, based on the co-occurrence rate that meets a standard, using the processor.

8. The information processing apparatus according to claim 7, wherein the first vector is made from vectors respectively representing a plurality of words included in the first sentence, and the other vector is made from vectors respectively representing a plurality of words included in the other sentence.

9. The information processing apparatus according to claim 7, wherein the first vector is calculated by accumulating vectors selected from among vectors each representing a plurality of words included in the first sentence, based on extreme values of the vectors and a preset extreme value, and the other vector is calculated by accumulating vectors selected from among vectors each representing a plurality of words included in the other sentence, based on extreme values of the vectors and the preset extreme value.

* * * * *